United States Patent
Young et al.

(10) Patent No.: US 6,963,935 B1
(45) Date of Patent: Nov. 8, 2005

(54) PERIPHERAL UNIVERSAL BUS HUB

(75) Inventors: Bruce A. Young, LeMars, IA (US); Frank W. Liebenow, Dakota Dunes, SD (US); Mark Rapaich, Westfield, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/386,556

(22) Filed: Aug. 31, 1999

(51) Int. Cl.[7] .................................................. G06F 13/14
(52) U.S. Cl. ............................ 710/29; 710/6; 345/161; 345/168; 345/349
(58) Field of Search ........................ 710/6, 26, 29, 710/103; 345/161, 168, 349, 163, 344; 355/18

(56) References Cited

U.S. PATENT DOCUMENTS

| | | | |
|---|---|---|---|
| 4,453,211 A | 6/1984 | Askinazi et al. ............ 395/500 |
| 4,766,418 A | 8/1988 | Dowsett et al. ......... 340/365 R |
| 4,939,511 A | 7/1990 | Hinckley ............... 340/825.78 |
| 5,305,449 A | 4/1994 | Ulenas ........................ 395/500 |
| 5,307,297 A | 4/1994 | Iguchi et al. ............. 364/708.1 |
| 5,339,095 A | 8/1994 | Redford ...................... 345/158 |
| 5,375,165 A | 12/1994 | Haber et al. .................. 379/90 |
| 5,375,168 A | 12/1994 | Kudelski ..................... 380/14 |
| 5,450,078 A | 9/1995 | Silva et al. .................... 341/23 |
| 5,504,483 A | 4/1996 | Hoffmann et al. ............. 341/22 |
| 5,594,470 A | 1/1997 | Meyerson et al. ........... 345/169 |
| 5,790,201 A * | 8/1998 | Antos .......................... 348/552 |
| 5,793,359 A | 8/1998 | Ushikubo .................... 345/169 |
| 5,841,424 A | 11/1998 | Kikinis ........................ 345/168 |
| 5,870,080 A * | 2/1999 | Burnett et al. ............... 345/163 |
| 5,890,015 A * | 3/1999 | Garney ........................... 710/1 |
| 6,128,484 A * | 10/2000 | Singkornrat et al. ......... 455/420 |
| 6,131,130 A * | 10/2000 | Van Ryzin ..................... 710/6 |
| 6,147,682 A * | 11/2000 | Kim ............................ 345/211 |
| 6,216,188 B1 * | 4/2001 | Endo et al. .................. 710/103 |
| 6,272,563 B1 * | 8/2001 | Ajanovic et al. ............. 710/29 |
| 6,278,454 B1 * | 8/2001 | Krishnan .................... 345/349 |
| 6,297,870 B1 * | 10/2001 | Nanba ......................... 355/18 |
| 6,336,900 B1 * | 1/2002 | Alleckson et al. .......... 600/485 |
| 6,359,610 B1 * | 3/2002 | Shah et al. .................. 345/156 |

FOREIGN PATENT DOCUMENTS

JP     11288352      10/1999

OTHER PUBLICATIONS

Gateway, Gateway 2000 Destination User Guide, Gateway 2000 Inc., Oct. 1996, 4 pages, N. Sioux City, SD.

* cited by examiner

*Primary Examiner*—A. Elamin
(74) *Attorney, Agent, or Firm*—Jeffrey A. Proehl; Rodney L. Lacey; Schwegman, Lundberg, Woessner, Kluth

(57) ABSTRACT

A peripheral communications protocol hub includes an input device such as a keyboard or remote cursor control wirelessly connected to a host computer. The input device has a number of connectors for connection of peripherals to the input device. The connection of input device to peripheral may be wired or wireless.

27 Claims, 4 Drawing Sheets

PERIPHERAL UNIVERSAL BUS HUB

FIELD

The present invention relates generally to communications protocols, and more specifically to a communications protocol hub integrated with an input device.

BACKGROUND

It has become more and more common to have a computer based home entertainment system, integrating a computer with other home entertainment products, such as a VCR, audio devices, computer peripherals, and the like. Integrated personal computer and television systems are known in the art as a "convergence environment" in which a personal computer (PC) is integrated with other capabilities, such as and usually including at least television (TV) capability. Such hardware components are known and available within the art. For example, the Gateway Destination PC/TV system, available from Gateway 2000, Inc., provides a convergence environment across two primary modes of operation: TV viewing, and PC operation (i.e., such that the system provides TV and PC capability). Such a system is available from Gateway 2000, Inc., and is known as the Gateway Destination system.

Peripheral computer devices attached to a computer may include, for example and not by way of limitation, a mouse or other pointing device, printers, scanners, modems, keyboards, joysticks and game pads, and virtual reality devices such as gloves and visors. These devices are typically physically connected to the computer CPU box via cables and the like. As such, mobility and range of the devices is somewhat limited. Although longer cables may be attached to the devices, for each device attached, a cord is used.

Some peripheral devices such as keyboards, mice, joysticks, and the like have recently been equipped with wireless communication links to the main computer. Such wireless links include radio frequency (RF) links and infra-red links. Other links may be viable, such as optical and the like. However, due to the movement nature of many such peripherals, such as a mouse, joysticks, game pads, and the like, a wireless link may be difficult to maintain since movement may interrupt the wireless link, especially in the case of an infrared link.

Wireless peripherals such as keyboards, joysticks, and the like allow the peripheral to be moved further away from the main computer, without the interference of a number of cords or cables leading to the main computer. However, other devices which are not commonly available as wireless devices, such as a mouse, printer, scanner, and the like, are still often desired or even required to be near the keyboard. Long cords for connection of such devices clutter the area, and pose potential problems with respect to safety and convenience.

Relatively recently, a consortium of computer vendors proposed a new type of bus structure to replace the existing serial peripheral bus. The Universal Serial Bus (USB) open-architecture standard specifies USB devices known as "hubs" that provide attachment points for other USB devices, such as USB-compliant peripherals (called "functions") or additional hubs. Self-powered hubs and functions contain independent power supplies to power themselves, and self-powered hubs can also power any other devices attached to them. A "root" hub embedded in the computer routes data between the USB peripherals and the appropriate processing logic in the computer. The standard also defines USB software that works with current power management software to enable the suspending and resuming of devices attached to the USB in response to the state of the computer. The combination of the computer, the standard operating system, the root hub, and the USB software is called a USB "host".

Each hub has multiple attachment points, known as "ports", to which its functions and other hubs are connected by means of USB-specific cables. Functions are generally standard computer peripherals which conform to the USB standard, or specialized circuitry designed to add certain functionality to the computer. Functions can be hardware, firmware, software, or a combination. A single USB port can be used to connect up to 127 peripheral devices of all types. These devices may be referred to as functions. The USB supports high speed data transfers of 12 million bits per second (Mbps), which allows USB to support telephony, audio and compressed video data streams.

It also establishes a universal cable connector which can provide power at various levels to peripherals attached to the bus. In addition, the USB standard defines a common logical interface for all types of peripherals that simplifies the design of supporting USB software and enables easy configuration of a system. USB Thus allows for so-called plug and play connection outside the computer case, reducing the need for the use of internal dedicated computer slots and controller cards, and also reducing the need for reconfiguration of the computer system each time a peripheral is added or changed. USB allows "on-the-fly" reconfiguration of a system as soon as a peripheral is plugged into a USB connector. No rebooting or setup of the system is necessary.

USB hubs have been placed outside the computer box before. For example, USB hubs have been placed in speakers attached to a computer system, and are commonly attached to computer monitors. The reason for these attachments is that the USB hub requires power, either self contained, or from an active power source. Monitors and speakers for computer systems are typically independently powered, providing the power for a USB hub. Speakers and monitors are also typically connected directly to the computer CPU box, and are positioned near it.

It would be desirable to provide increased functionality of peripheral devices away from the main computer unit. It would further be desirable to provide communication links for peripheral devices.

SUMMARY

The present invention overcomes the problems of the prior art by providing an input device with an integrated communications protocol hub and peripheral device connectors on the input device. Input devices such as keyboards, remote cursor control devices, and the like, are examples of input devices which are the subject of the present invention.

The peripheral with integrated communications protocol hub may communicate with a host computer via a wireless link. The communications protocol hub integrated with the input device allows the connection of peripherals directly to the input device, without the restriction that they be connected directly to the main computer unit. This allows freedom for the input device and necessary peripherals to be used with a system such as the Gateway Destination system discussed above.

In another embodiment, a computer system has a main unit, and an input device in which a communications protocol hub is integrated. The input device is in communication with the main unit via a wireless link. Additional peripherals, such as a mouse or other pointing device, a scanner, a printer, joysticks, game pads, or the like are connected to the communications protocol hub integrated within the input device, and are not tethered to the main computer unit. Such peripherals may be in communication with the input device via wired or wireless links. Standard peripherals may be used. They do not need to be specially modified to connect to the input device.

In the above embodiments, only a single link to the main unit from the input device is required. The link is wireless in one embodiment. The present invention eliminates the need for a number of cords or wireless links to be made to the main computer unit, and fees the user to move peripherals away from the main computer unit without the problems of having cord attachments to the main unit, or the expense of having multiple wireless links from peripherals to the main computer unit.

A method embodiment of the present invention comprises connecting peripheral devices of a computer system to a single input device, the input device having an integrated universal serial bus hub, and connecting or linking the peripherals of the computer system to a main computer unit wirelessly through the input device communications protocol hub.

DESCRIPTION OF EMBODIMENTS

In the following detailed description of sample embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
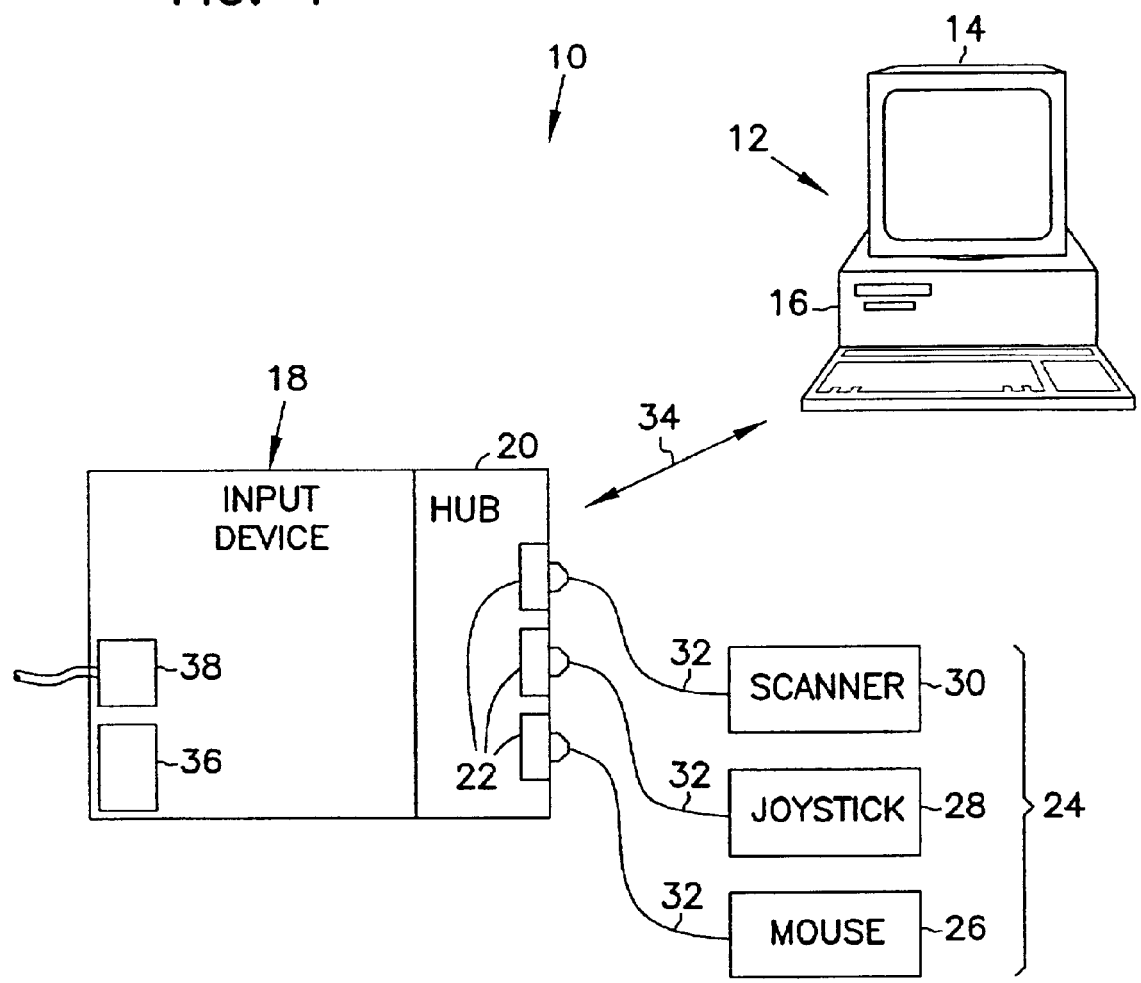
FIG. 1 is a block diagram view of an embodiment of the present invention.

In FIG. 1, an apparatus embodiment 10 of the present invention is shown in conjunction with a main computer unit 12 having a display 14 and a central processing unit 16. Embodiment 10 has an input device 18 integrated with a communications protocol hub 20 having peripheral device connectors such as slots or ports 22. Communications protocol hub 20 communicates with a plurality of connected peripheral devices through one or more of a number of communications protocols. The communication between the hub 20 and any connected devices may be wireless or wired, depending upon the peripheral device. Communications protocol hub 20 is preferably integrated with input device 18, but may be implemented in a separate component which is physically connected to the input device 18. Connector slots or ports 22 allow the connection to the input device 18 of a plurality of peripheral devices 24, such as mouse 26, joystick 28, and scanner 30.

In one embodiment, the hub 20 is a universal serial bus (USB) hub. A USB hub offers the ability to connect a large number of USB peripherals to the hub 20 without requiring a large amount of real estate for connector slots. It should be understood that any variety or combination of communications protocols could be used with the hub 20 without departing from the scope of the invention. Such protocols include, by way of example and not limitation, to serial and parallel ports, IEEE-48, RS-232, Centronics parallel, gameport I/F, and the like.

Input device 18 is in communication with main computer unit 12 via a communication link 34. Communication link 34 is a wireless link, such as an infrared or radio frequency link, in one embodiment. If communication link 34 is a wireless link, the input device 18 must have a separate power supply to provide power to communications protocol hub 20, as well as to any attached peripheral devices 24. In one embodiment, power is provided to the input device 18 and its communications protocol hub 20 by an internal battery source 36, which may be disposable or rechargeable batteries. Such power sources are known in the art, and will not be described further herein. Alternatively, power may be provided to input device 18 and communications protocol hub 20 by a connection 38 to an active power source such as a standard wall electrical outlet or the like. Such a connection is also known in the art and will not be described further herein.

If the communications protocol hub is a USB hub, the power requirements and specifications for USB hubs and devices are enumerated in Chapter 7 of the Universal Serial Bus Specification, Revision 1.1, dated Sep. 23, 1998. It is to be understood that such specifications often change with time, and that it is sufficient that the power provided to USB hub 20 meets the USB specification. Modification of the power supplied to the communications protocol hub 20 is well within the scope of one of ordinary skill in the art.

Peripheral devices 24 may be connected to input device 18 communications protocol hub 20 connectors 22 via standard cables 32, or may be connected to input device 18 communications protocol hub 20 via a wireless link. As has been mentioned, a single USB hub can support up to 127 such devices 24.

Figure 2:
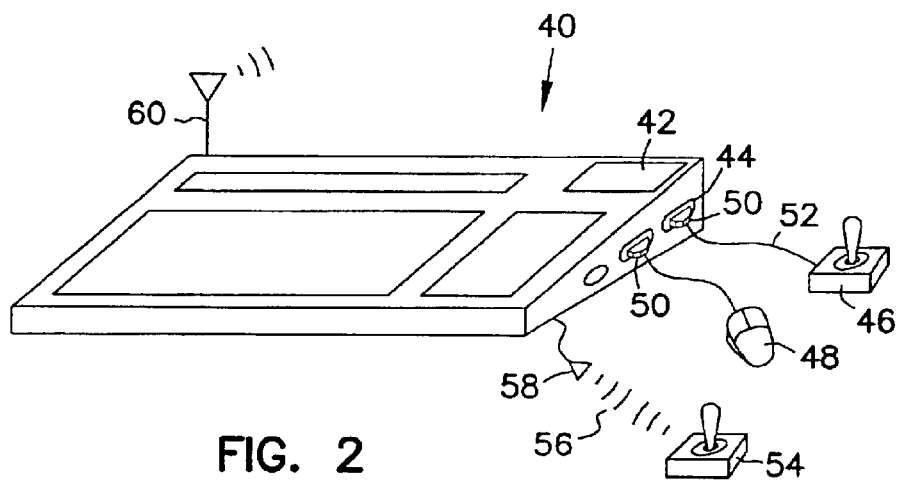
FIG. 2 is a perspective view of a keyboard embodiment of the present invention.
Figure 3:
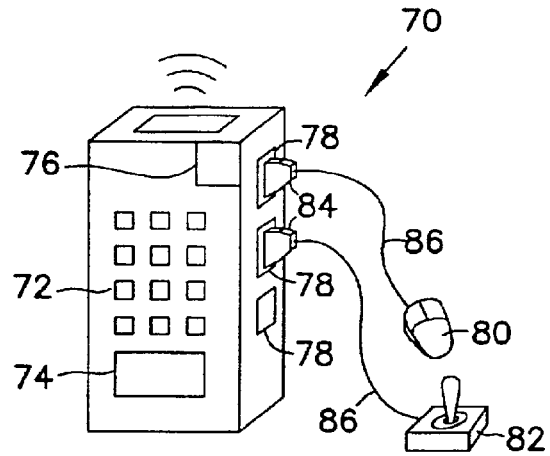
FIG. 3 is a perspective view of a remote cursor control embodiment of the present invention.
Figure 4:
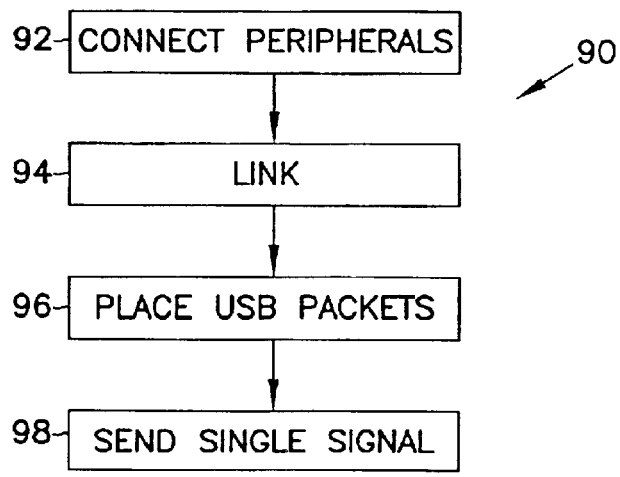
FIG. 4 is a flow chart diagram of a method embodiment of the present invention.
Figure 5:
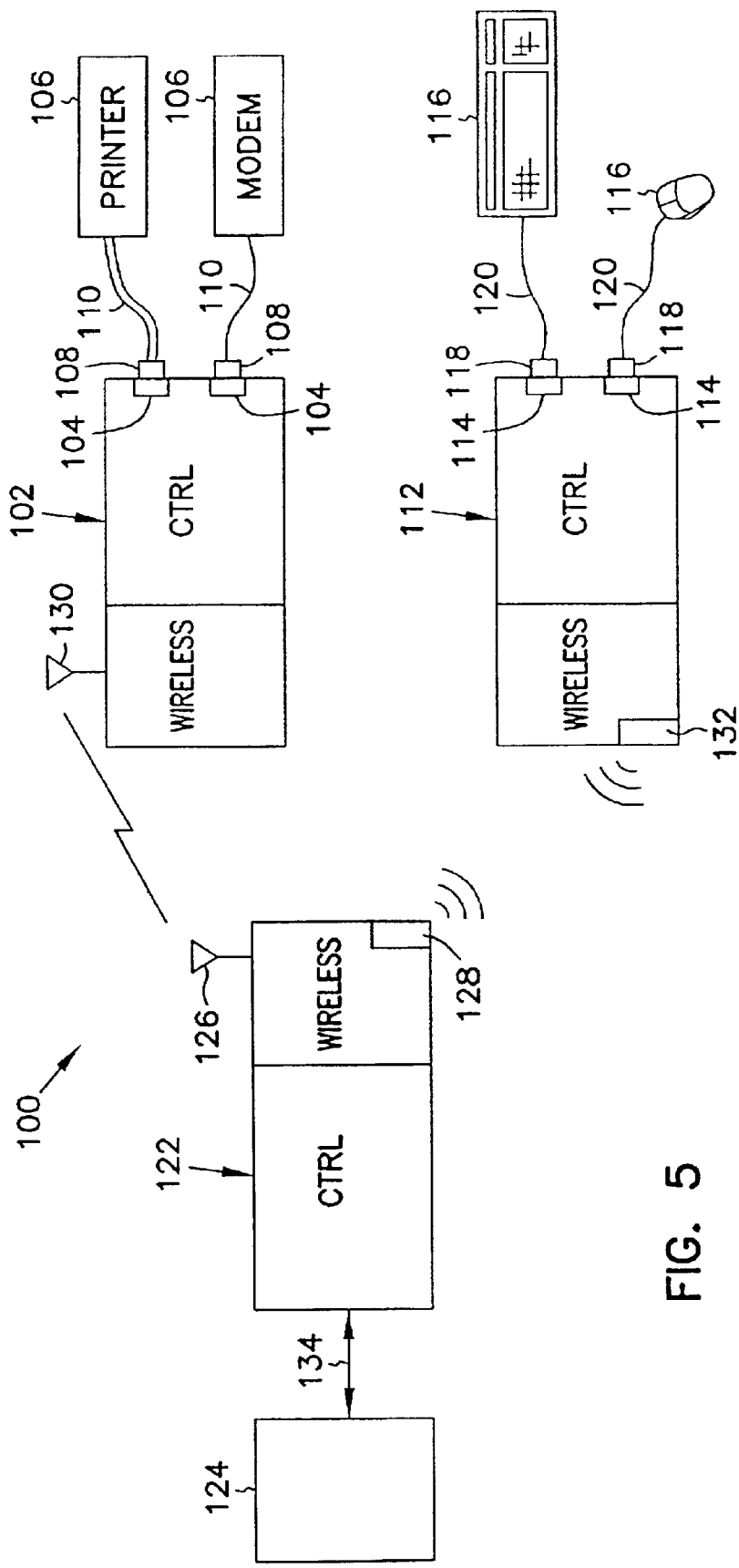
FIG. 5 is a block diagram view of another embodiment of the present invention.
Figure 6:
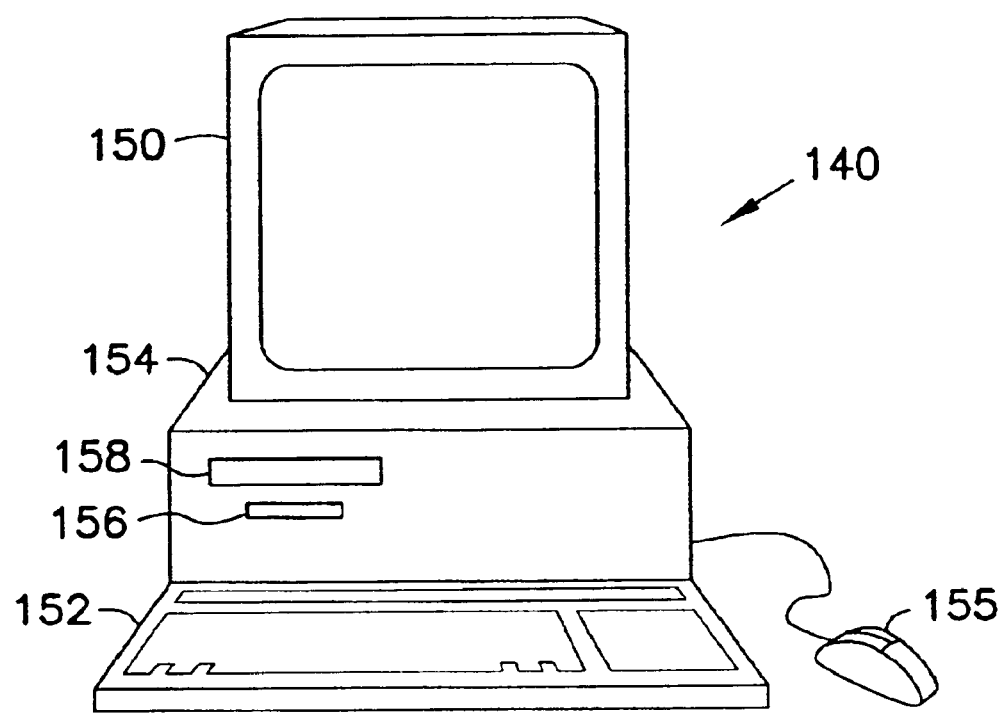
FIG. 6 is a view of a computer system on which embodiments of the present invention may be practiced.

FIG. 2 shows a keyboard embodiment 40 of an input device in accordance with the present invention. Keyboard 40 includes an integrated communications protocol hub 42 and a plurality of peripheral device connector slots 44. Connector slots 44 facilitate the connection of peripheral devices such as joystick 46 and mouse 48 to keyboard 40 with standard USB connector plugs 50 and cabling 52. The connector slots 44 may be USB, serial or parallel, IEEE-48, RS-232, Centronics parallel, gameport I/F, and the like.

Alternatively, peripheral devices may communicate with keyboard 40 via a wireless communication link. For example, joystick 54 is shown as having a wireless communication link 56 to keyboard 40. Signals from wireless joystick 54 are received by transceiver 58 on keyboard 40. Because of the usual close proximity of a wireless joystick 54 to keyboard 40, the wireless link 56 may be a weak link.

Keyboard 40 may communicate with a host computer such as computer 12 via a wireless link. Various types of wireless links to a host may be used. For example, a radio frequency antenna 60 is shown as part of keyboard 40. Radio frequency signals from keyboard 40 are communicated to a host computer such as computer 12 via the wireless link. Data and operation information for the input device and any attached peripheral devices are also transmitted along the wireless link. In this manner, the peripheral communications protocol hub allows connection of peripherals directly to the keyboard, which may be located remotely to the host computer. Alternatively, the wireless connection to a host computer may be via an infrared link, or other wireless links known in the art.

What is claimed is:

1. A peripheral communications protocol hub, comprising:
    an input device;
    a hub integrated with the input device; and
    a plurality of communications protocol connectors on the input device.
2. The peripheral hub of claim 1, wherein the input device is a keyboard.
3. The peripheral hub of claim 1, wherein the communications protocol is universal serial bus (USB).
4. The peripheral hub of claim 1, wherein the input device is a remote cursor control.
5. The peripheral hub of claim 1, wherein the communications protocol connectors comprise a wireless connection to at least one wireless peripheral device.
6. Th peripheral hub of claim 1, wherein the communications protocol connectors comprise a plurality of connectors chosen from a group consisting of:
    USB, parallel port, serial port, IEEE-48, RS-232, Centronics parallel, and gameport I/F.
7. A wireless peripheral hub, comprising:
    an input device capable of wireless communication with a host computer;
    a hub integrated with the input device; and
    a plurality of connector slots on the input device.
8. The wireless peripheral hub of claim 7, wherein the peripheral hub is a USB hub.
9. The wireless peripheral hub of claim 7, wherein the peripheral hub is selected from a group of peripheral hub types consisting of:
    USB, parallel port, serial port, IEEE48, RS-232, Centronics parallel, and gameport I/F.
10. A computer system, comprising:
    a computer;
    a peripheral communications protocol hub, comprising:
        an input device capable of wireless communication with the computer;
        a hub integrated with the input device; and
        a plurality of connector slots on the input device.
11. The computer system of claim 10, wherein the input device is a keyboard.
12. The computer system of claim 10, wherein the input device is a remote cursor control.
13. The computer system of claim 10, wherein the communications protocol hub is a USB hub.
14. The computer system of claim 10, wherein the peripheral communications hub further comprises means for wirelessly connecting to at least one wireless peripheral device.
15. A keyboard, comprising:
    an alphanumeric keypad connectable to a host device by a wireless connection;
    a communications protocol hub;
    a plurality of communications protocol connectors; and
    a power supply.
16. A remote control, comprising:
    an alphanumeric keypad connectable to a host device by a wireless connection;
    a communications protocol hub;
    a plurality of communications protocol connectors; and
    a power supply.
17. A method of operating a computer system and its peripherals, comprising:
    connecting peripherals of the system to a single input device, the input device having an integrated communications protocol hub; and
    linking the peripherals of the computer system wirelessly to a main computer unit through the input device communications protocol hub.
18. The method of claim 17, wherein the communications protocol is USB.
19. The method of claim 17, wherein linking the peripherals comprises:
    placing USB packets in a wireless communication sent to the main computer.
20. The method of claim 17, wherein linking further comprises:
    sending a single signal to the main computer.
21. A machine readable medium comprising machine readable instructions for causing a computer to perform a method comprising:
    linking the peripherals of a computer input device to a main computer unit through a communications protocol hub on the input device, the communications protocol hub wirelessly connected to the main computer unit.
22. The machine readable medium of claim 21, wherein the communications protocol hub is a USB hub.
23. The machine readable medium of claim 21, wherein the machine readable instructions for linking further comprise:
    placing USB packets in a wireless communication sent to the main computer; and
    sending a single signal to the main computer.
24. The peripheral hub of claim 5, wherein said at least one peripheral device comprises a remote cursor control.
25. The peripheral hub of claim 6, wherein the communications protocol connectors further comprise a wireless connection to at least one wireless peripheral device.
26. A peripheral input device comprising:
    a keypad;
    a wireless interface configured to communicate with a convergence system;
    a communications protocol hub;
    a first communications protocol connector; and
    a second communications protocol connector;
    wherein said first communications protocol connector is a universal serial bus *USB) connector; and
    wherein said second communications protocol connector is configured in accordance with a protocol chosen from a group consisting of: parallel, serial port, IEEE48, RS-232, Centronics parallel and gameport.
27. The peripheral input device of claim 26, further comprising:
    a wireless port configured for connection to at least one wireless peripheral device.

* * * * *